US008166503B1

(12) United States Patent
Rosenberg et al.

(10) Patent No.: US 8,166,503 B1
(45) Date of Patent: Apr. 24, 2012

(54) SYSTEMS AND METHODS FOR PROVIDING MULTIPLE VIDEO STREAMS PER AUDIO STREAM

(75) Inventors: Jeremy C. Rosenberg, Havre de Grace, MD (US); Stuart H. Farber, Horsham, PA (US)

(73) Assignee: Music Choice, Horsham, PA (US)

( * ) Notice: Subject to any disclaimer, the term of this patent is extended or adjusted under 35 U.S.C. 154(b) by 889 days.

(21) Appl. No.: 12/212,203

(22) Filed: Sep. 17, 2008

Related U.S. Application Data

(63) Continuation-in-part of application No. 11/837,772, filed on Aug. 13, 2007, now Pat. No. 7,926,085, which is a continuation of application No. 10/066,793, filed on Feb. 6, 2002, now Pat. No. 7,275,256.

(60) Provisional application No. 60/972,969, filed on Sep. 17, 2007, provisional application No. 60/315,046, filed on Aug. 28, 2001.

(51) Int. Cl.
*H04N 5/445* (2011.01)
*H04N 7/173* (2011.01)
(52) U.S. Cl. ............... 725/39; 725/109; 725/134
(58) Field of Classification Search .......... 725/39, 725/109, 134
See application file for complete search history.

(56) References Cited

U.S. PATENT DOCUMENTS
2002/0194619 A1* 12/2002 Chang et al. ............ 725/134
* cited by examiner

*Primary Examiner* — Pankaj Kumar
*Assistant Examiner* — Franklin Andramuno
(74) *Attorney, Agent, or Firm* — Rothwell, Figg, Ernst & Manbeck, P.C.

(57) ABSTRACT

A system and method for providing multiple video presentations per audio program. In one aspect, the method comprises (a) assigning a first packet identifier (PID) to a first elementary stream, wherein the first elementary stream comprises video packets corresponding to a high-definition video presentation; (b) assigning a second PID to a second elementary stream, wherein the second elementary stream comprises video packets corresponding to a standard-definition video presentation and the second PID is different than the first PID; (c) assigning a third PID to a third elementary stream, wherein the third elementary stream comprises audio packets corresponding to a selected audio recording, wherein the third PID is different than the second PID; and (d) (1) creating a program map table that includes the first PID, the second PID and the third PID or (2) creating (i) a first program map table that includes the first PID and the third PID and (ii) a second program map table that includes the second PID and the third PID. In this way, the method provides a high-definition and a standard-definition video presentation per a single audio program.

26 Claims, 13 Drawing Sheets

SYSTEMS AND METHODS FOR PROVIDING MULTIPLE VIDEO STREAMS PER AUDIO STREAM

The present application claims the benefit of Provisional Patent Application No. 60/972,969, filed on Sep. 17, 2007 and is a continuation-in-part of U.S. patent application Ser. No. 11/837,772, filed on Aug. 13, 2007, which is a continuation of U.S. patent application Ser. No. 10/066,793, filed on Feb. 6, 2002 (now U.S. Pat. No. 7,275,256), which claims the benefit of U.S. Provisional Patent Application No. 60/315,046, filed on Aug. 28, 2001. Each of above referenced applications and the above referenced patent are incorporated herein in their entirety by this reference.

BACKGROUND OF THE INVENTION

1. Field of the Invention

The present invention is generally related to providing video content to accompany audio content.

2. Discussion of the Background

Presently, there exist systems that broadcast music via satellite and cable to consumers' televisions or set-top boxes or other broadcast receiving devices. Within such a system, a consumer has typically a selection of 45 music channels to choose from. The channels comprise a variety of music genres. Conventionally, for each one of the 45 music channels, the system broadcasts a program that includes an audio stream and a video stream.

Because of the advent of high-definition television sets, there is a desire to provide high-definition video as well as standard video. A conventional way to accomplish this is to transmit for each of 45 channels a high-definition program comprising the audio stream and a high-definition video stream and a standard-definition program comprising the audio stream and a standard-definition video stream (i.e., a video stream having a lower video resolution than the high-definition video stream). The problem with such a conventional system is that it requires a significant amount of bandwidth. What is desired, therefore, is an improved system that provides both high-definition and standard-definition video, while using less bandwidth than the conventional system described above.

SUMMARY OF THE INVENTION

The present invention may be used in, among other things, systems in which it is desired to have a high-definition video stream and standard-definition video stream accompany a single audio stream.

A method according to one embodiment of the invention includes: selecting a sound recording; after selecting the sound recording, transmitting a trigger message, wherein the trigger message comprises an identifier that is associated with the selected sound recording; receiving the trigger message; in response to (e.g., as a result of) receiving the trigger message, generating at least a first video image and a second video image based, at least in part, on the same pre-defined configuration data and/or the identifier contained in the trigger message, wherein the resolution of the first video image is greater than the resolution of the second video image; and transmitting a stream comprising: (i) audio data packets corresponding to the selected sound recording, (ii) video packets corresponding to the first video image, and (iii) video packets corresponding to the second video image. The method may further include transmitting a stream comprising: (i) audio data packets corresponding to the selected sound recording, (ii) video packets corresponding to the first video image, and (iii) video packets corresponding to the second video image. The stream, in some embodiments, is a transport stream that includes a packet containing a program map table (PMT) for identifying audio and video components of a program. In some embodiments, the PMT identifies (i) the video packets corresponding to the first video image as being a component of the program, (ii) the video packets corresponding to the second video image as being a component of the program, and (iii) the audio packets as being a component of the program. In some embodiments, the method further comprises assigning to each of the audio packets a first packet identifier (PID); assigning to each of the video packets corresponding to the first video image a second PID; and assigning to each of the video packets corresponding to the second video image a third PID, wherein the second PID is different than the first PID. The stream may further comprise a program map table, and the program map table includes the first PID, the second PID and the third PID. In other embodiment, the stream may further comprise a first program map table and a second program map table, wherein the first program map table includes the first PID and the third PID and the second program map table includes the second PID and the third PID. In some embodiments, the first video image comprises an intra-coded frame and the second video image comprises an intra-coded frame, and, in these embodiments, the first video image may further comprise null predictive-frames and the second video image further comprise null predictive-frames. That is, the first and second video images may be encoded according to an MPEG standard, but the may also be encoded according to other standards. Thus, the video images may be a JPEG image or GIF image.

A method according to another embodiment includes: (a) assigning a first packet identifier (PID) to a first elementary stream, wherein the first elementary stream comprises video packets corresponding to a high-definition video presentation; (b) assigning a second PID to a second elementary stream, wherein the second elementary stream comprises video packets corresponding to a standard-definition video presentation and the second PID is different than the first PID; (c) assigning a third PID to a third elementary stream, wherein the third elementary stream comprises audio packets corresponding to a selected audio recording, wherein the third PID is different than the second PID; and (d) (1) creating a program map table that includes the first PID, the second PID and the third PID or (2) creating (i) a first program map table that includes the first PID and the third PID and (ii) a second program map table that includes the second PID and the third PID.

In another aspect, the present invention may provide a system for providing a visual complement to an audio service. In some embodiments, the system includes: a sound recording selector configured to select a sound recording; a trigger message transmitter configured to transmit a trigger message after the sound recording selector selects a sound recording, wherein the trigger message comprises an identifier that is associated with the selected sound recording; and a video image generator configured to generate or select at least a first video image and a second video image in response to receiving the trigger message such that the resolution of the first video image is greater than the resolution of the second video image, wherein the video image generator is configured to generate or select said video images based, at least in part, on configuration data and/or the identifier contained in the received trigger message. The system may further include a transmitter for transmitting a stream comprising: (i) audio data packets corresponding to the selected sound recording, (ii) video packets corresponding to the first video image, and (iii) video packets corresponding to the second video image. This stream may be a transport stream and the stream further comprises a packet containing a program map table (PMT) for identifying audio and video components of a program, and the PMT may identify (i) the video packets corresponding to the first video image as being a component of the program, (ii) the video packets corresponding to the second video image as being a component of the program, and (iii) the audio packets as being a component of the program. In some embodiments, the system my include an encoder configured to: assign to each of the audio packets a first packet identifier (PID); assign to each of the video packets corresponding to the first video image a second PID; and assign to each of the video packets corresponding to the second video image a third PID, wherein the second PID is different than the first PID. In such embodiments, the stream may further include a program map table, and the program map table includes the first PID, the second PID and the third PID. In other embodiments, the stream may further comprise a first program map table and a second program map table, wherein the first program map table includes the first PID and the third PID and the second program map table includes the second PID and the third PID.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention.

DETAILED DESCRIPTION OF THE PREFERRED EMBODIMENTS

Figure 1:
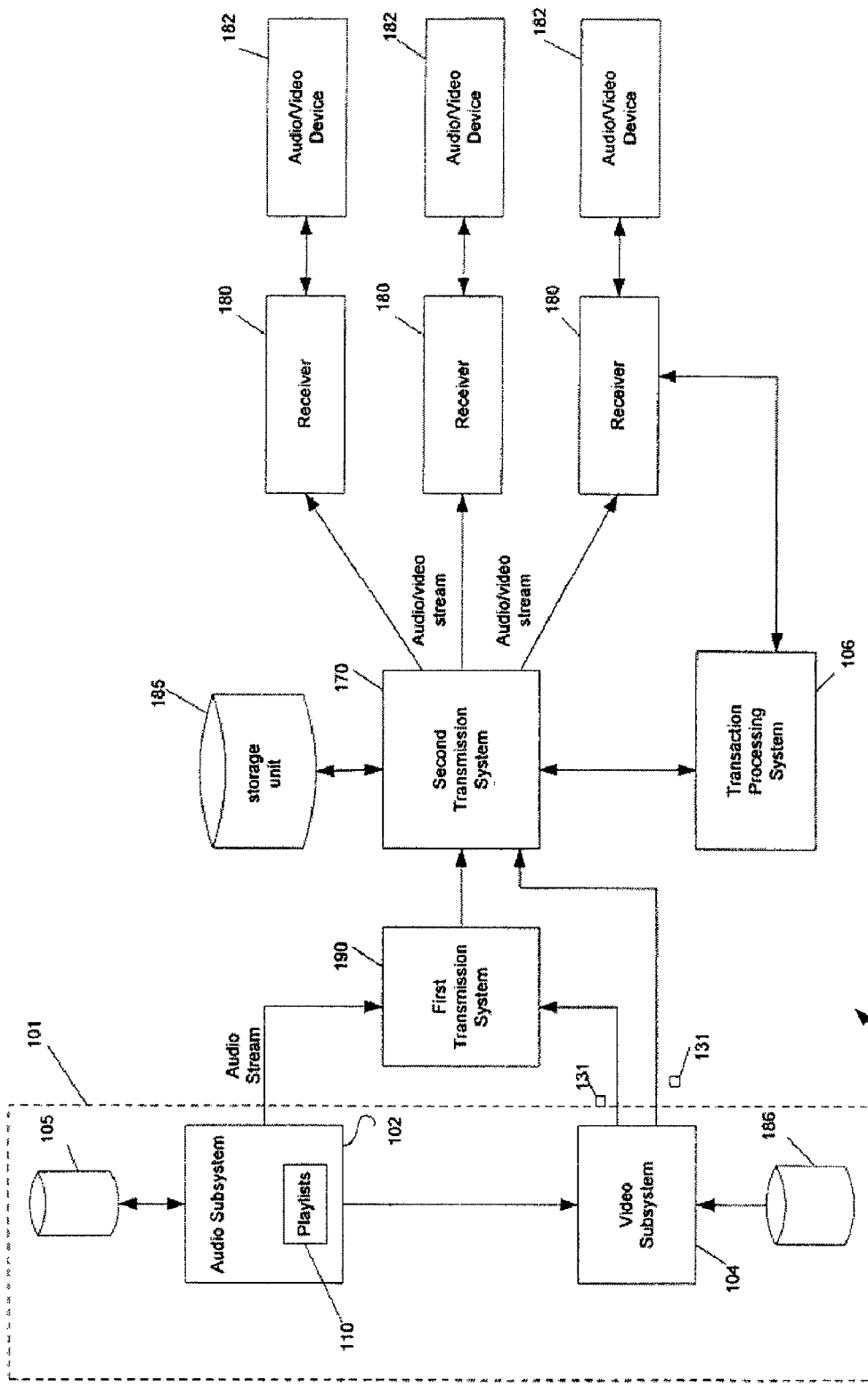
FIG. 1 is a block diagram of one embodiment of an audio/video system for providing audio/video programming to consumers.

FIG. 1 is a block diagram of one embodiment of a system 100 for providing audio/video programming. System 100 includes an audio/video system 101 comprising an audio subsystem 102 that provides audio content for transmission to listeners over one or more channels and a video subsystem 104 for providing video content that is transmitted together with the audio content and that complements the audio content. System 100 further includes a transaction processing subsystem 106 for processing transactions, such as electronic commerce ("e-commerce") transactions.

Audio/video system 101 may comprise a data processing system, a persistent storage device, and volatile memory. Stored in the storage device and/or the volatile memory are computer instructions (i.e., software) that enable audio/video system 101 to perform the functions and processes described herein. Audio subsystem 102 and video subsystem 104 may be implemented in software or a combination of software and hardware.

Audio subsystem 102 has access to a sound recording library 105 that includes a large number of sound recordings (e.g., tracks from albums of many different genres). The sound recordings may be stored on compact discs, hard disks, or other media for storing data.

Audio subsystem 102 preferably includes a playlist 110 for each of the one or more channels supported by system 100. A playlist 110 for a particular channel specifies sound recordings that have been programmed for transmission to the listeners of system 100 over that channel during a given period of time. A new playlist 110 is typically generated for each channel on some periodic basis (e.g., daily, weekly, etc.).

Audio subsystem 102 typically retrieves, encodes, and streams the sound recordings to consumers in the order in which the sound recordings are listed in the playlists 110. Preferably, the sound recordings are encoded by audio subsystem 102 according to the Dolby AC-3 coding technique.

Audio subsystem 102 may stream the encoded sound recordings to a transmission subsystem 190, which may transmit the encoded sound recordings to an audio/video signal transmission system 170. Transmission system 170 may be a broadcast transmission system, such as a cable head-end or a direct broadcast satellite system. Transmission system 170 comprises a transmitter (not shown) for transmitting signals and a computer (not shown) programmed to perform processes described herein.

Transmission system 170 transmits the encoded sound recordings to audio/video receivers 180, which are coupled to an audio/video device 182 that reproduces the sound recordings for the subscribers. Receivers 180 may be conventional digital cable or satellite set-top boxes. Audio/video device 182 may comprise a TV screen or monitor and speakers.

Video subsystem 104, in one embodiment, is responsible for, among other things, generating or retrieving, in real time for each channel, a video image specification that specifies a visual complement of the audio for the channel. That is, the video image specification defines how the listeners' TV screens will look when the listener tunes to the particular channel.

More specifically, the video image specification may comprise information specifying one or more visual media asset identifiers, each of which identify one or more visual media assets. The video image specification may also specify the screen position where each identified asset is to be displayed. Examples of video media assets include: graphic image files (e.g., GIF files, JPEG files, bitmap files, etc.), video files (e.g., MPEG files, AVI files), text messages, etc. It is these assets that are used to create the visual complement to the audio service.

Figure 2:
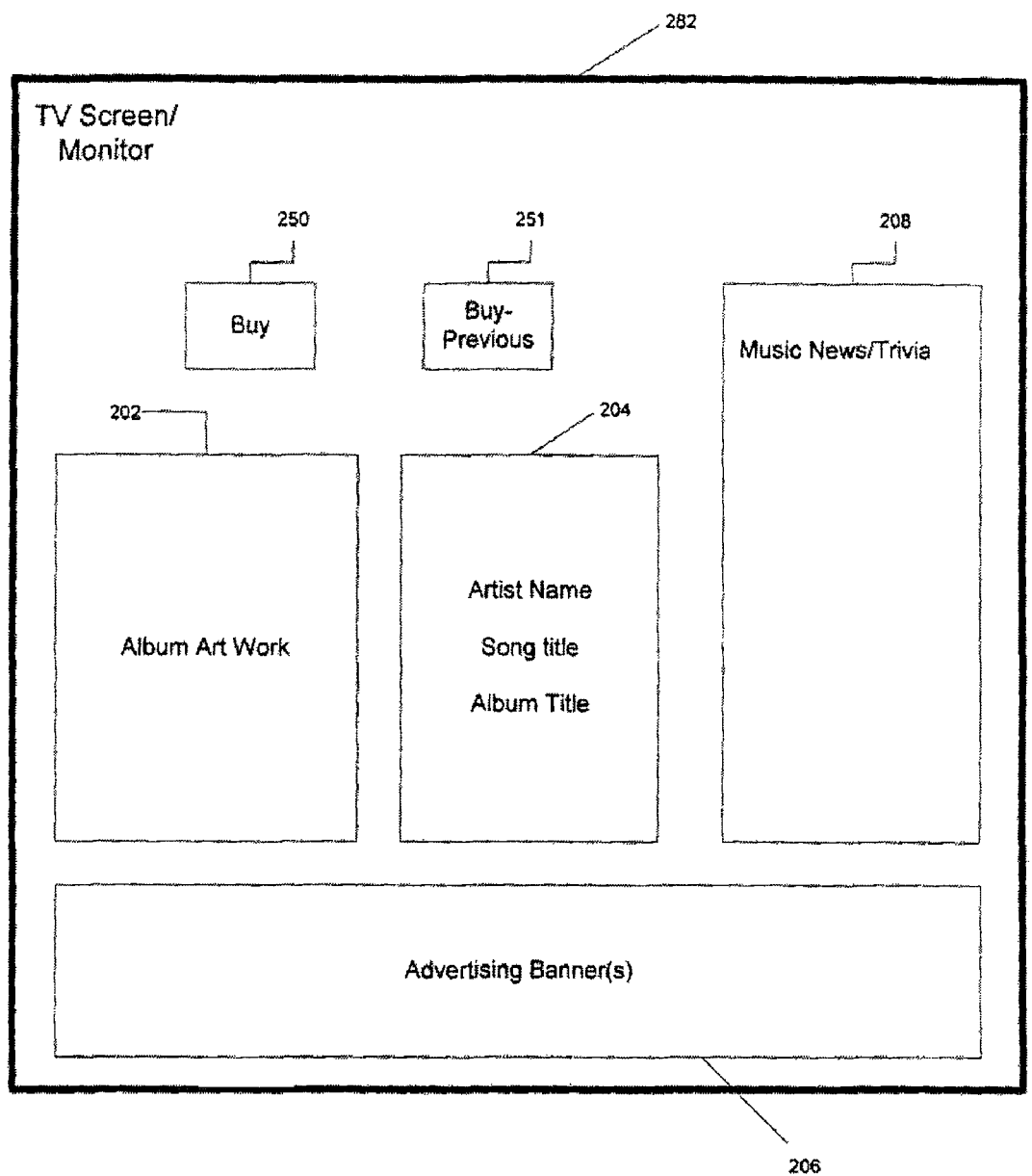
FIG. 2 illustrates various locations on a TV screen where visual media assets may be displayed.

In some embodiments, the video image specification for a particular channel is based, at least in part, on the sound recording that the particular channel is currently playing. Therefore, for example, if a U2 song from the Joshua Tree album is currently being played on channel 51, then, at some particular point in time while the song is playing, the video image specification for channel 51 might specify that an image of the Joshua Tree album art is to be displayed at a first location 202 (see FIG. 2) on a TV screen (or monitor) 282.

Additionally, the video image specification may also specify that the name of the song, artist, and album is to be displayed at a second location 204 on the TV screen 282, and an advertising banner is to be displayed at a third location 206 on the TV screen 282.

In one embodiment, the video image specification may also specify that certain music trivia and/or news is to be displayed at a fourth location 208 on the TV screen 282. It should be understood that album art, advertising banners, text messages, and other visual media assets may be positioned anywhere on the TV screen 282 and that the invention is not limited to the particular arrangement of visual media assets shown in FIG. 2.

The video image specification may also be time driven. That is, at least some of the assets (e.g., advertising banners, music trivia, and news) specified by the video image specification are determined as function of time, regardless of which sound recording is currently playing.

In some embodiments, each video image specification for a particular channel includes an asset identifier that identifies a text message that contains information pertaining to the sound recording that is currently being played over the particular channel. This information may include the name of the artist who created the sound recording, the title of the sound recording, and the name of an album on which the sound recording can be found.

The video image specification may further include purchase information for enabling a listener of system 100 to purchase the album or the sound recording. The purchase information may include an indicator that the sound recording or album is saleable, a price, and a unique code that identifies the album.

Figure 6:
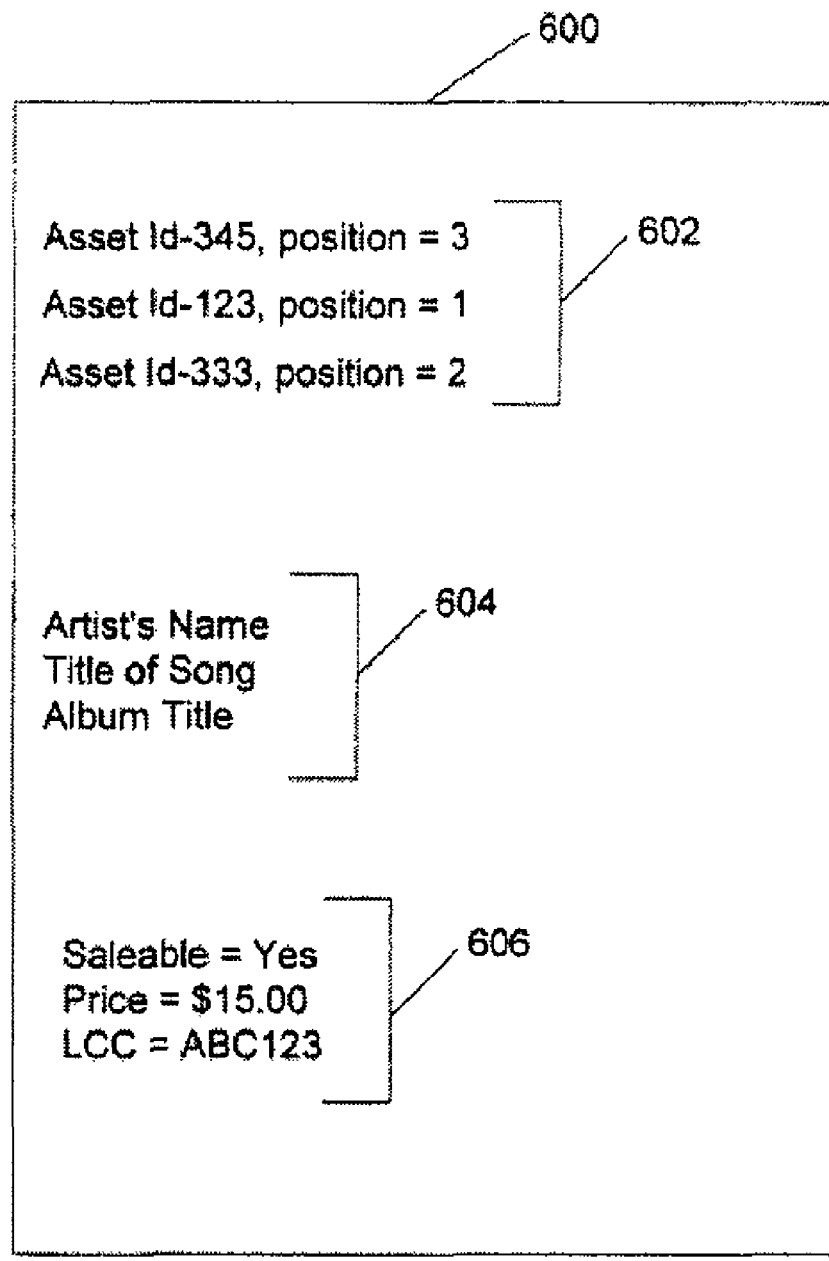
FIG. 6 illustrates an exemplary video image specification.

FIG. 6 illustrates an exemplary video image specification 600. As shown in FIG. 6, video image specification 600 includes a list of visual media asset identifiers 602 and associates a screen position with each asset identifier. Video image specification 600 may also include sound recording information 604, and purchase information 606. Video image specification 600 may be an extensible mark-up language (XML) file or a hyper-text mark-up language (HTML) file.

In the embodiment shown in FIG. 1, after generating/receiving a video image specification for a particular channel, video subsystem 104 transmits the video image specification (e.g., transmits a file 131 containing the video image specification) so that it will be received by transmission system 170. Video subsystem 104 may use transmission subsystem 190 to transmit the file 131 to transmission system 170 or may use a public network (e.g., the Internet) or private network to transmit the file 131 to transmission system 170.

Transmission system 170 may have access to a data storage unit 185. Preferably, storage unit 185 has a very short access time. Storage unit 185 stores the visual media assets specified in the video image specification (storage unit 185 is updated periodically by an administrator to ensure that storage unit 185 contains the necessary visual media assets). Therefore, borrowing from the above example, storage unit 185 stores the image of the Joshua Tree album art that is displayed when the song from U2's Joshua Tree album is playing.

In embodiments where transmission system 170 does not have access to storage unit 185, a storage unit 186 that is coupled to video subsystem 104 stores the visual media assets specified in the video image specification, and video subsystem 104 retrieves the assets from storage 186 and transmits them to transmission system 170.

After receiving the video image specification for the particular channel, transmission system 170 parses the video image specification and creates a first video image and a second video image, each of which corresponds to the video image specification, and transmits the video images to audio/video receivers 180. Preferably, the first video image has a higher resolution than the second video image. Thus, we shall refer to the first video image as a "high-definition" video image and we shall refer to the second video image as a "standard-definition" video image. The video images conform to the video image specification contained in the video image specification so that, for example, when the video images are displayed on the audio/video devices 182, the visual media assets defined in the video image specification are displayed in the locations as specified in the video image specification. In a preferred embodiment, the video images are encoded according to a Moving Pictures Experts Group (MPEG) standard. For example, in some embodiments, the video image is encoded according to an MPEG standard and comprises an MPEG I-frame. In some embodiments, it may comprise an MPEG I-frame followed by null P-frames. In other embodiments it may be encoded according to other protocols (e.g., it may be encoded according to a Joint Photographic Experts Group (JPEG) standard or the Graphic Interchange Format (GIF)). Accordingly, transmission system 170 may include an image encoder.

Figure 3:
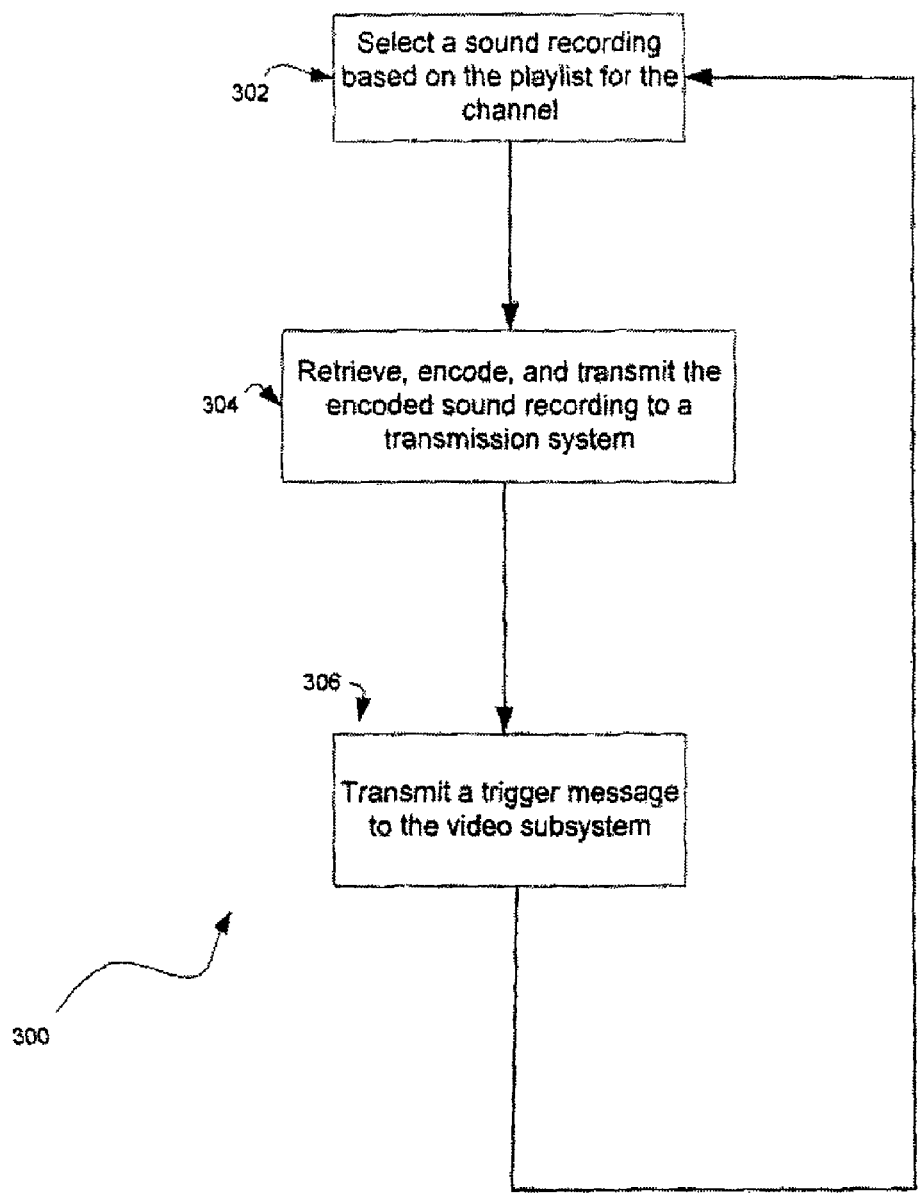
FIG. 3. is a flow chart illustrating a process according to an embodiment of the invention.
Figure 4:
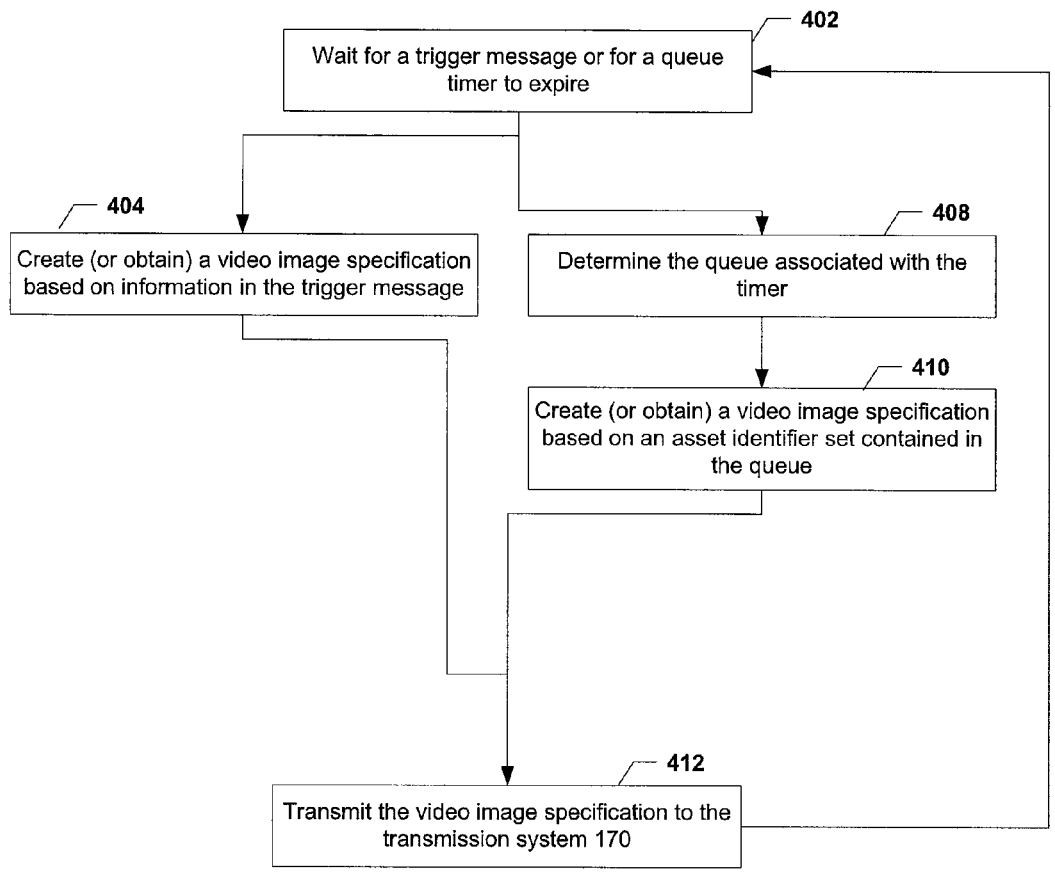
FIG. 4. is a flow chart illustrating a process according to an embodiment of the invention.
Figure 5:
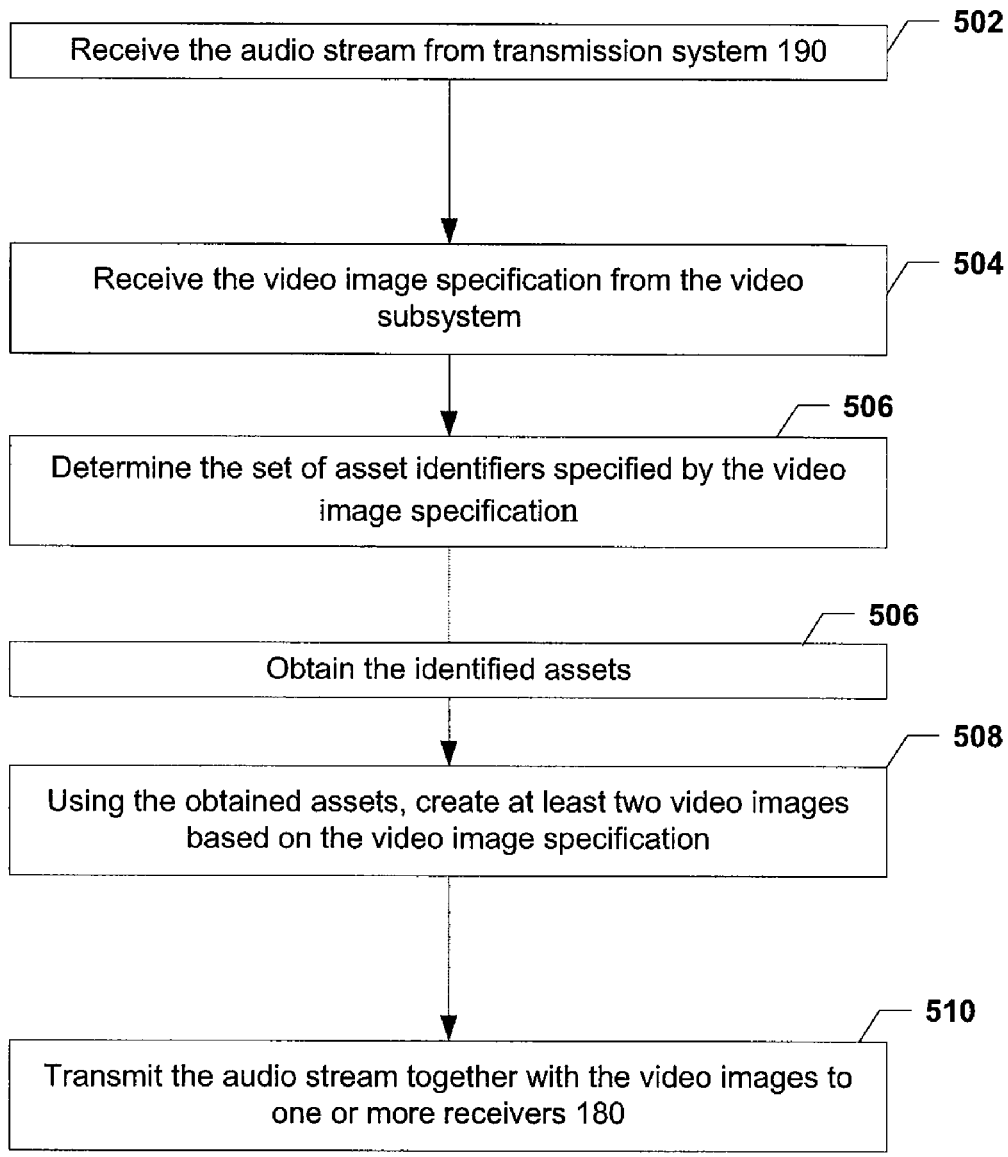
FIG. 5. is a flow chart illustrating a process according to an embodiment of the invention.

FIGS. 3-5 are flow charts illustrating processes 300, 400, and 500, according to one embodiment, performed by audio subsystem 102, video subsystem 104, and transmission system 170 respectively, for providing an interactive, visual complement to the audio service for a particular channel. The same process is performed for the other channels.

Process 300 (see FIG. 3) begins in step 302, where audio subsystem 102 selects a sound recording from library 105 based on a playlist for the particular channel. After selecting the sound recording, audio subsystem 102 retrieves it from library 105, encodes it, and transmits it to transmission subsystem 190 (step 304), which then transmits it to a system, such as, for example, a transmission system 170, that transmit audio/video signals to the subscribers' receivers 180.

At or about the same time as step 304 is performed, audio subsystem 102 transmits to video subsystem 104 a trigger message (e.g., a trigger signal) specifying a sound recording identifier that identifies the sound recording selected in step 302 (step 306). The trigger message may also include other information pertaining to the sound recording and a channel identifier. After audio subsystem 102 finishes transmitting the sound recording selected in step 302, control passes back to step 302, where audio subsystem 102 selects another sound recording from library 105 based on the playlist for the particular channel.

Referring now to FIG. 4, process 400 begins in step 402, where video subsystem 104 waits for a trigger message from audio subsystem 102 or for a timer to expire. If video subsystem 104 receives a trigger message from audio subsystem 102, control passes to step 404, and if a timer expires, control passes to step 408.

In step 404, video subsystem 104 creates (or obtains) a video image specification based on information in the trigger message (e.g., a sound recording identifier and a channel identifier) and pre-defined configuration data. An illustration of pre-defined configuration data is shown in FIG. 4 of U.S. Pat. No. 7,275,256 (the '256 patent) and discussed therein. Also, a method of creating a video image specification is described and illustrated in the '256 patent (see e.g., FIG. 5 of the '256 patent and the discussion of FIG. 5 starting at col. 9).

In step 408, video subsystem 104 determines a channel and an asset identifier queue that is associated with the expired timer (see FIG. 4, element 420 of the '256 patent for an illustration of an exemplary queue). Next (step 410), video subsystem 104 creates (or obtains) a video image specification for the identified channel based, at least in part, on the contents of the asset identifier queue associated with the expired timer.

After creating the video image specification in either step 404 or 410, video subsystem 104 transmits the video image specification to audio/video transmission system 170 (step 412). After step 412, process 400 returns to step 402.

Referring now to FIG. 5, process 500 begins in step 502. In step 502, transmission system 170 receives from transmission subsystem 190 the audio stream transmitted by audio subsystem 102. Next (step 504), while receiving the audio stream, transmission system 170 receives from video subsystem 104 a video image specification for the particular channel. After receiving the video image specification for the particular channel, transmission system 170 determines a set of asset identifiers specified by the video image specification and screen position associated with each asset identifier, which may also be specified by the video image specification (step 505). Next (step 506), transmission system 170 obtains (e.g., retrieves from storage unit 185) the assets identified by the asset identifiers determined in step 505. Next (step 508), transmission system 170 uses the assets obtained in step 506 and screen position information determined in step 505 to create two video images that conform to the video image specification: (1) a high-definition video image and (2) a standard-definition video image. Next (step 510), the video images created in step 512 are transmitted to receivers 180 together with the received audio stream. While transmission system 170 is still receiving the audio stream, the process may return to step 504.

Figure 7:
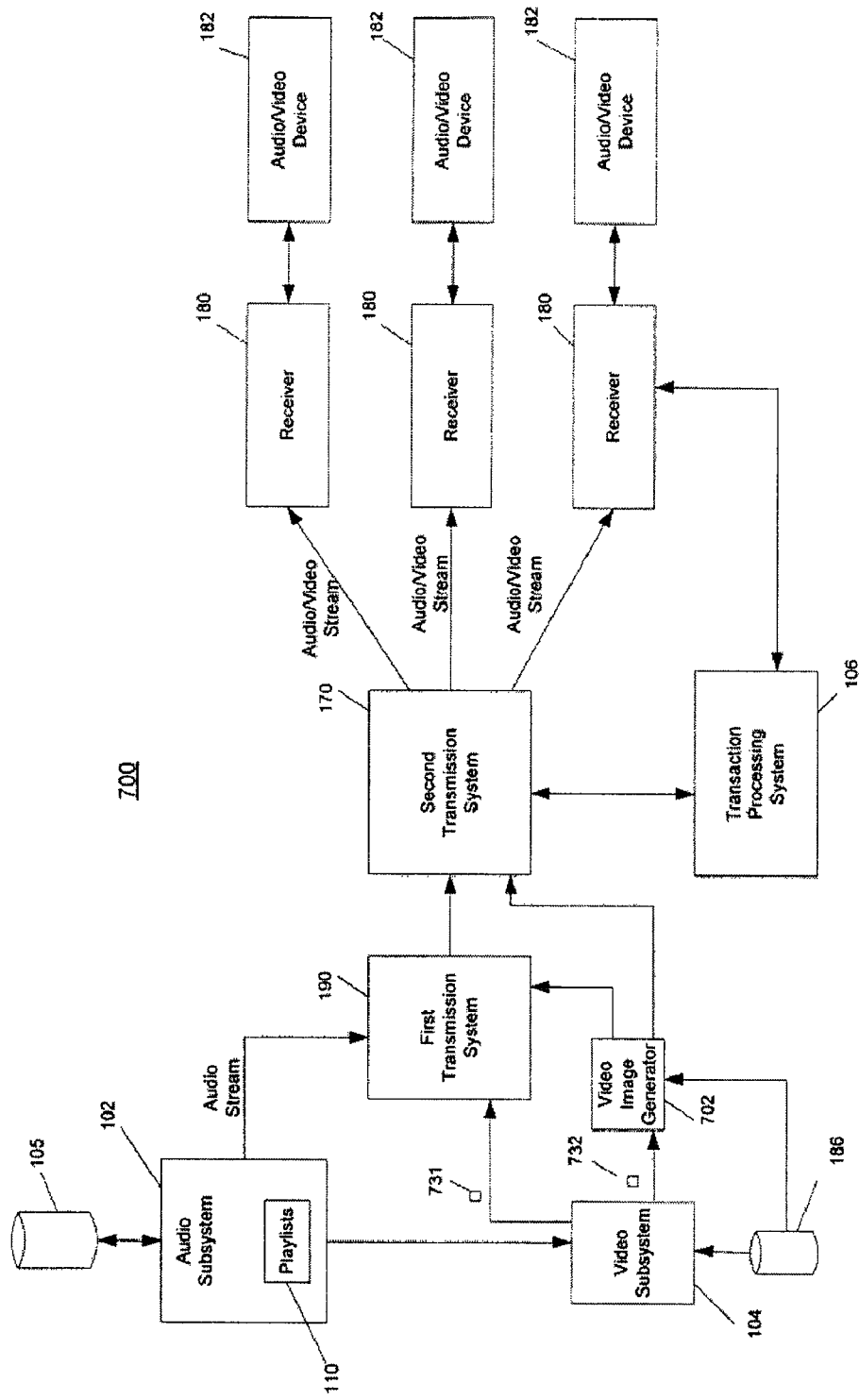
FIG. 7 is a block diagram of a system according to another embodiment of the invention.

Referring now to FIG. 7, FIG. 7 is a block diagram of a system 700 for providing audio/video programming according to another embodiment of the present invention. System 700 is similar to system 100 with the exception that system 700 further includes a video image generator 702 that is coupled to video subsystem 104. Additionally, instead of transmission system 170 receiving video image specification 131 generated by video subsystem 104, as described above with respect to FIG. 1, video image generator 702 receives a video image specification 732 generated by video subsystem 104. Further, video subsystem 104 may also generate a video image specification 731 and transmits video image specification 731 to transmission subsystem 190. Video image specification 731 may comprise purchase information and/or sound recording information corresponding to the sound recording most recently selected by audio subsystem 102.

Video image generator 702 functions to create two video images based on the video image specification 732. Accordingly, video image generator 702 may include an image encoder. In one embodiment, after creating the video images, video generator 702 provides the video images to transmission subsystem 190. Transmission subsystem 190 functions to transmits the video images, video image specification 731 (if any), and the audio stream generated by audio subsystem 102 to transmission system 170. In one embodiment, the video images, video image specification 731 and audio stream are transmitted together in an MPEG-2 transport stream.

In the embodiment shown in FIG. 7, audio subsystem 102 performs process 300, as described above, and video subsystem 104 perform process 400, with the exception that, instead of transmitting the video image specification to transmission system 170, video subsystem provides the video image specification to video generator 702, which then performs steps 504-508 of process 500 and then provides the video images to transmission system 190.

Figure 8:
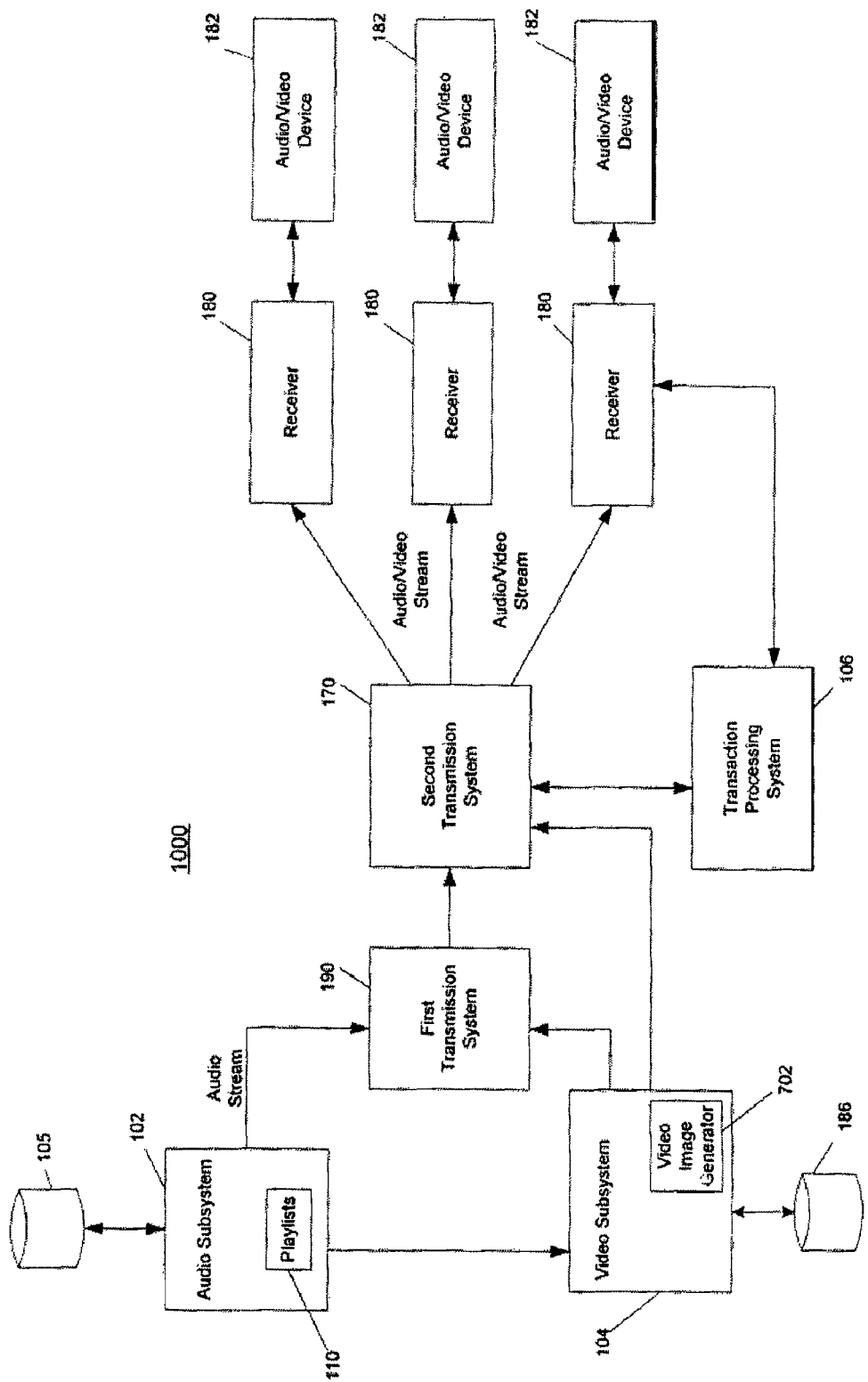
FIG. 8 is a block diagram of a system according to another embodiment of the invention.
Figure 9:
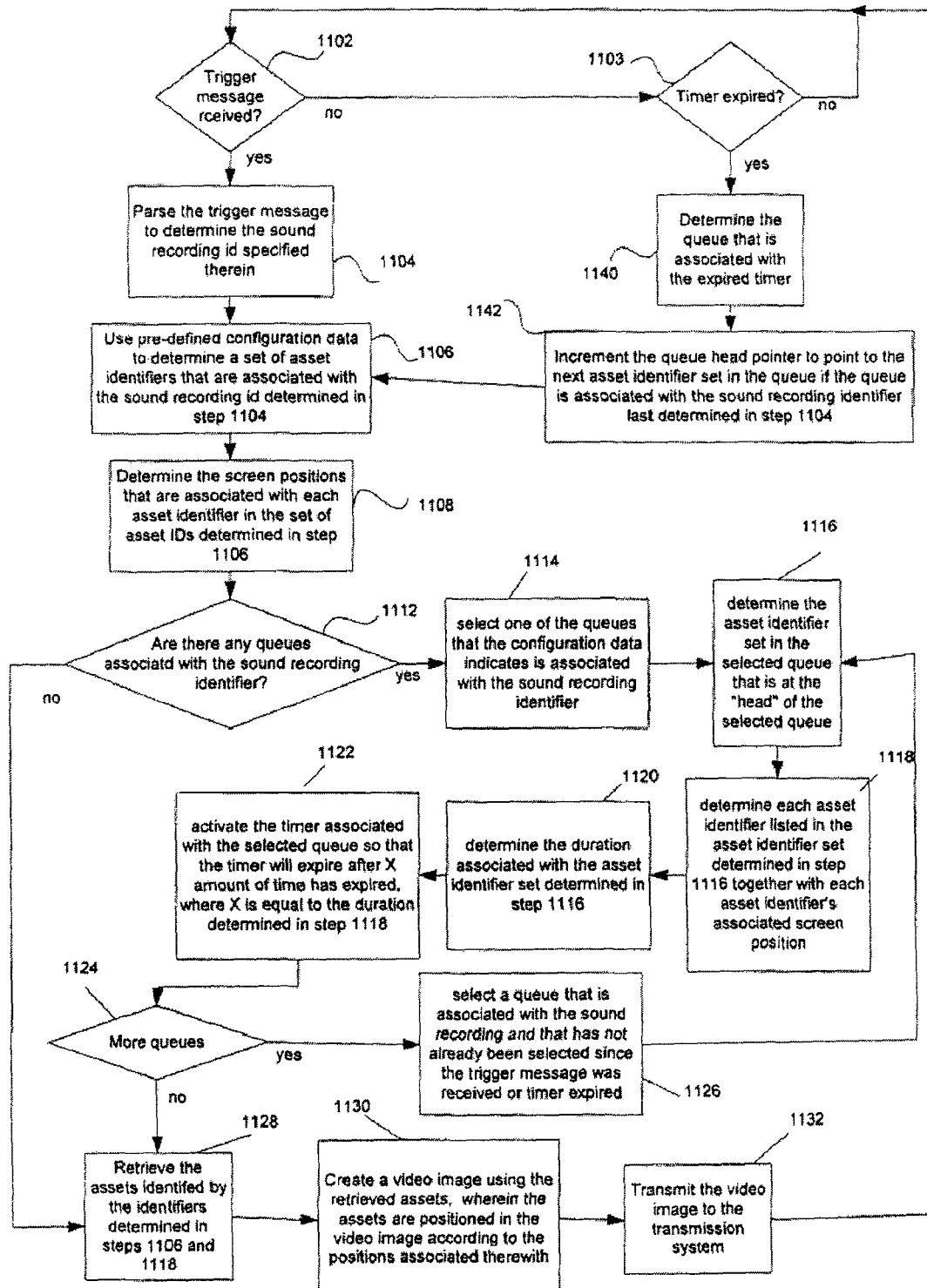
FIG. 9. is a flow chart illustrating a process according to an embodiment of the invention.

Referring now to FIG. 8, FIG. 8 is a block diagram of a system 1000 for providing audio/video programming according to another embodiment of the present invention. System 1000 is similar to systems 100 and 700. However, in system 1000 video subsystem 104 comprises the video image generator 702, which may be implemented in hardware and/or software. FIG. 9 illustrates a process 1100 performed by video subsystem 104 according to the embodiment shown in FIG. 8.

Process 1100 begins in step 1102, where video subsystem 104 determines whether a trigger message from audio subsystem has been received. If a trigger message is received, control passes to step 1104, otherwise control passes to step 1103. In step 1103, video subsystem 104 determines whether an asset queue timer has expired. If an asset queue timer expires, control passes to step 1140, otherwise control passes back to step 1102.

In step 1104, video subsystem 104 parses the trigger message to determine the sound recording identifier and/or channel identifier specified therein. Next (step 1106), video subsystem 104, uses pre-defined configuration data to determine a set of zero or more asset identifiers associated with the sound recording identifier and/or channel identifier. Video subsystem 104 then determines the screen position that is associated with each asset identifier in the set (step 1108). Next (step 1112), video subsystem 104 uses the pre-defined configuration data to determine whether there are any asset identifier queues associated with the sound recording identifier and/or channel identifier. If there are, control passes to step 1114, otherwise control passes to step 1128.

In step 1114, video subsystem 104 selects one of the queues. Next (step 1116), video subsystem determines the asset identifier set in the selected queue that is at the head of the selected queue. After step 1116, control passes to step 1118.

In step 1118, video subsystem 104 determines each asset identifier included in the asset identifier set determined in step 1116 together with each asset identifier's associated screen position. Next (step 1120), video subsystem 104 determines the duration associated with the asset identifier set determined in step 1116. Next (step 1122), video subsystem 104 activates a timer associated with the selected queue so that the timer will expire after X amount of time has expired, where X is equal to the duration determined in step 1118. After step 1122, control passes to step 1124.

In step 1124, video subsystem 104 determines whether there are additional asset identifier queues associated with the sound recording identifier/channel identifier. If there are, control passes to step 1126, otherwise control passes to step 1128. In step 1126, video subsystem 104 selects one of the queues that has not already been selected. After step 1126, control passes back to step 1116.

In step 1128, video subsystem 104 retrieves the assets identified by the asset identifiers determined in steps 1106 and 1118. Next (step 1130), video subsystem 104 creates two video images using the retrieved assets (e.g., a high-definition video image and a standard-definition video image), wherein each asset is positioned in the video image according its associated position. After step 1130, control passes to step 1130, where the video images are provided to transmission system 190. Transmission system 190 transmits the video images together with an audio stream to transmission system 170 using an MPEG-2 transport stream. After step 1132, control passes back to step 1102.

In step 1140, video subsystem 104 determines the queue that is associated with the timer that expired. Next (step 1142), video subsystem 104 increments the head pointer associated with the queue determined in step 1140 to point to the next asset identifier set in the queue if the queue determined in step 1140 is associated with the sound recording identifier/channel identifier determined in step 1104. After step 1142, control passes to step 1106.

In another embodiment, the video images that complement the audio service are pre-generated. For example, they are generated prior to the time when they are scheduled to be displayed. For example, they may be generated one day or one week prior to when they are scheduled to be displayed.

In this embodiment where video images are pre-generated, a data structure (e.g., a configuration file) associates sound recording identifiers included in a playlist with an ordered set of video image identifiers, where each video image identifier identifies a first pre-generated video image (e.g., a high-definition (HD) video image) and a second pre-generated video image (e.g., a standard-definition (SD) video image). In some embodiments, the two video images (SD and HD) may contain the same content (e.g., they are created from the same video image specification). If the ordered set of video image identifier associated with a sound recording/channel identifier contains more than one video image identifier, then each video image identifier pair in the set may be associated with a time duration. The data structure may also associate purchase information with each sound recording identifier. In some embodiments, each video image identifier actually consists of two identifiers, one for identifying the high-definition video image and one for identifying the standard-definition video image.

Figure 10:
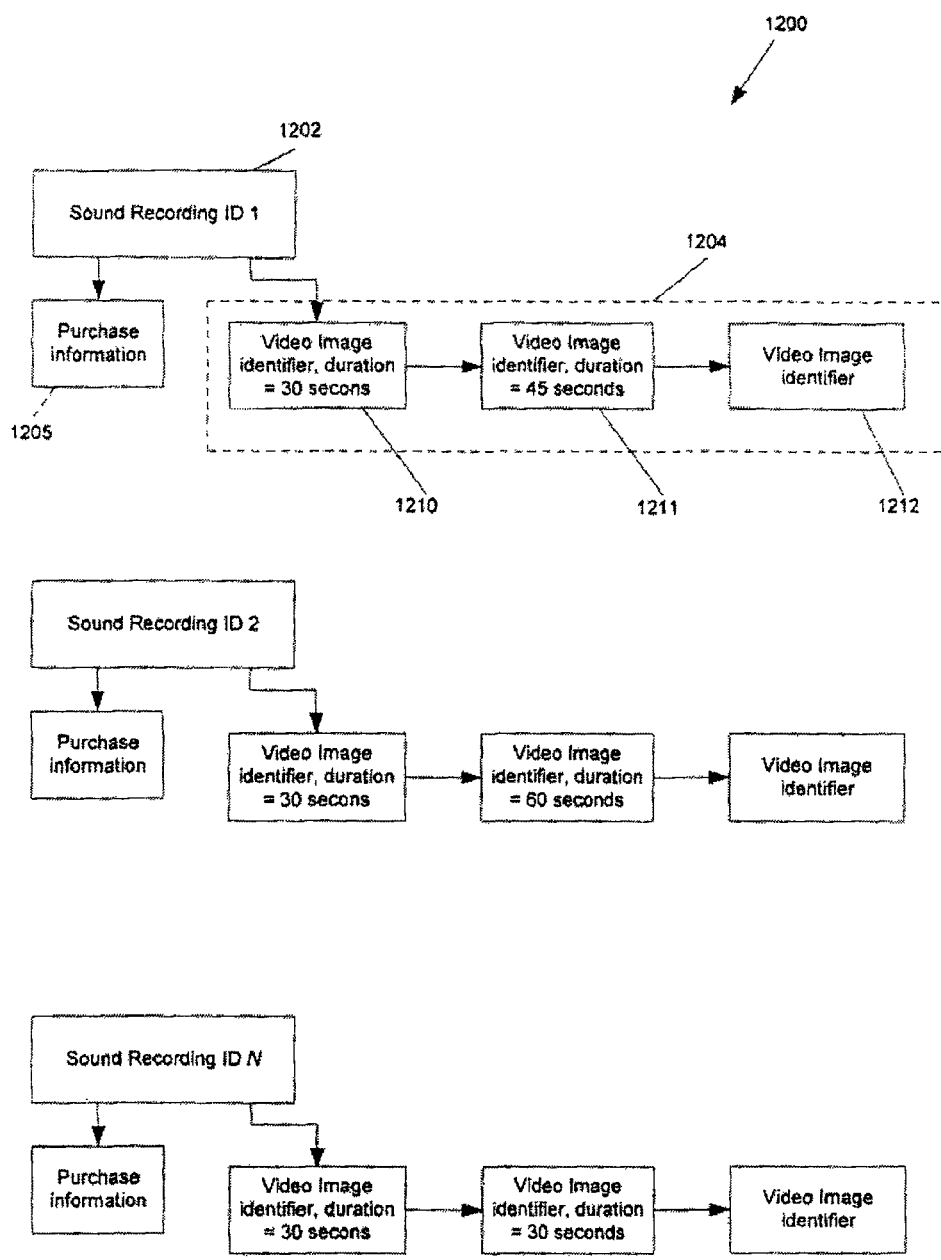
FIG. 10 illustrates an exemplary data structure.

FIG. 10 illustrates an exemplary data structure 1200 that associates sound recording identifiers with a set of one or more video image identifiers. For example, sound recording identifier 1202 is associated with an ordered set 1204 of video image identifiers and is associated with purchase information 1205. The ordered set of video image identifiers 1204 includes video image identifiers 1210, 1211, and 1212. Additionally, each video image identifier in set 1204, except for video image identifiers 1212, which is the last video image identifier in the order, is associated with a time duration.

Either video subsystem 104 or transmission system 170 may be able to retrieve the pre-generated video images from the storage unit in which they are stored. Thus, for example, the pre-generated video images may be stored in storage unit 185 or storage unit 186. Similarly, either video subsystem 104 or transmission system 170 may be able to retrieve data structure 1200. If, for example, the pre-generated video images are stored in storage unit 186 and video subsystem 104 has access to data structure 1200, then video subsystem 104 may perform process 1600 (see FIG. 11) in response to receiving a trigger message from audio subsystem 102.

Figure 11:
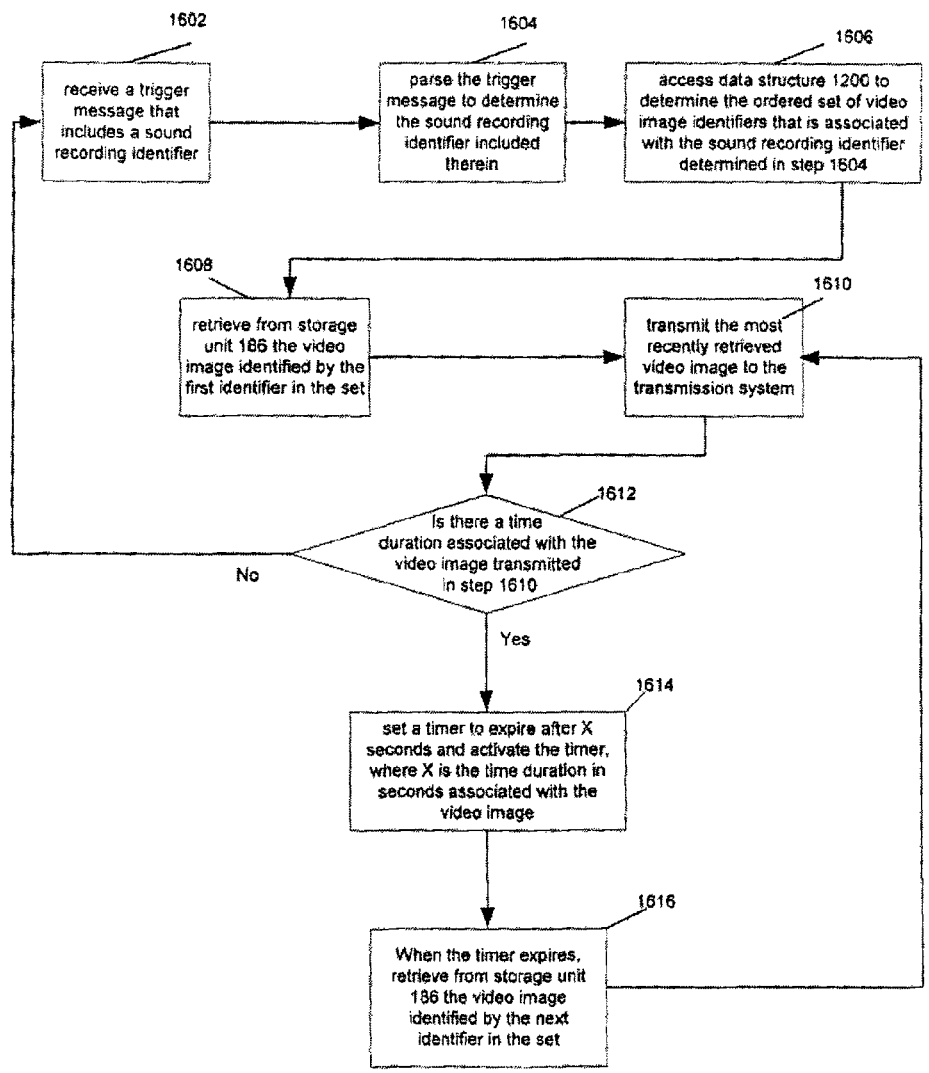
FIG. 11 is a flow chart illustrating a process according to an embodiment of the invention.

Referring now to FIG. 11, process 1600 begins in step 1602 where video subsystem 104 receives a trigger message that includes a sound recording identifier. Next (step 1604), video subsystem 104 parses the trigger message to determine the sound recording identifier included therein. Next (step 1606), video subsystem 104 accesses data structure 1200 to determine the ordered set of video image identifiers that is associated with the sound recording identifier determined in step 1604. Next (step 1608), video subsystem 104 retrieves from storage unit 186 the video images identified by the first identifier in the set. Next (step 1610), video subsystem 104 transmits the retrieved video images to transmission system 190.

In addition to transmitting the video image to transmission system 170, video subsystem may also transmit to transmission system 190 purchase information and/or commands that instruct the receivers to overlay selectable buttons (e.g., Buy button 250) on the video image to create an interactive service for the listeners. After step 1610, control passes to step 1612.

In step 1612, video subsystem 104 accesses data structure 1200 to determine whether there is a time duration associated with the video images transmitted in step 1610. That is, video subsystem 104 determines whether data structure 1200 associates a time duration with the video image identifier that identifies the video images. If there is no time duration associated with the video image, then control passes back to step 1602, otherwise control passes to step 1614. In step 1614, video subsystem 104 sets a timer to expire after X seconds and activates the timer, where X is the time duration in seconds associated with the video image. When the timer expires, video subsystem 104 retrieves from storage unit 186 the video images identified by the next identifier in the set (step 1616). After step 1616, control passes back to step 1610.

As discussed above, transmission system 190 may be configured to transmit together in an MPEG-2 transport stream an audio stream and two or more video streams corresponding to the two or more video images (e.g., the SD image and the HD image) that complement the audio stream. In many cases it is desirable to transmit two or more different video streams for the same audio stream because transmitting two such video streams along with the audio stream allows a receiver to select the most appropriate video stream to process and ignore the other video stream.

Figure 12:
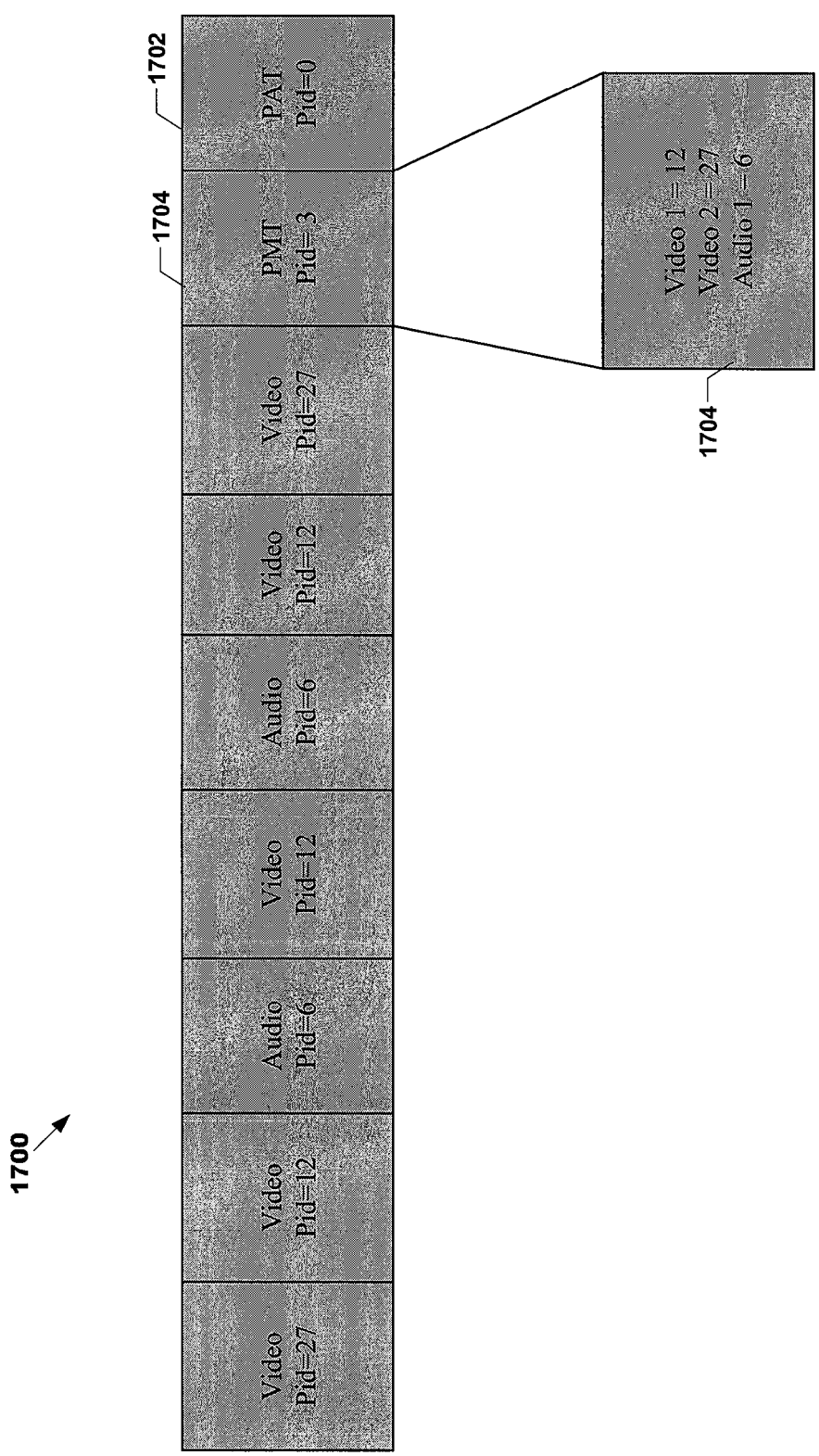
FIG. 12 illustrates a portion of a transport stream according to an embodiment of the invention.

In embodiments that use an MPEG transport stream to transmit one or more programs, this process may be implemented by having the MPEG transport stream contain, for at least one of the programs, two video streams (e.g., an SD video stream and an HD video stream) and at least one audio stream. Referring now to FIG. 12, FIG. 12 illustrates a portion of a transport stream 1700 according to one embodiment of the invention. As shown in FIG. 12, transport stream 1700 includes, among other things not shown, a program association table (PAT) 1702, a program map table (PMT) 1704, an HD video stream that is represented by the video packets having a packet identifier (PID) of 12, an SD video stream that is represented by the video packets having a PID of 27, and an audio stream that is represented by the audio packets having a PID of 6. As is further illustrated in FIG. 12, PMT 1704, which defines the set of streams (i.e., PIDS) that are associated with a particular program, identifies PIDS 12, 27 and 6 as being associated with the particular program. Accordingly, in one embodiment, at least one PMT in the transport stream identifies at least two different video streams and at least one audio stream. In this manner, bandwidth can be saved by enabling an HD video stream and an SD video stream to share the same audio stream.

Accordingly, after the video images that correspond to a particular audio stream are generated, system 100 may be configured to (1) create a first set of video packets corresponding to the first video image (e.g., the HD video image) and assign a particular PID (e.g., PID=12) to each of the video packets included in the first set; (2) create a second set of video packets corresponding to the second video image (e.g., the SD video image) and assign a particular PID (e.g., PID=27) to each of the video packets included in the second set; (3) create or receive a set of audio packets corresponding to the particular audio stream and assign a particular PID (e.g., PID=6) to each of the audio packets; and (4) create a PMT such that the PMT identifies (i) the particular PID (e.g., PID 12) assigned to the video packets included in the first set of video packets as containing video data for the program, (ii) the particular PID (e.g., PID 27) assigned to the video packets included in the second set of video packets as also containing video data for the program, and (iii) the particular PID (e.g., PID 6) assigned to the audio packets containing the audio data for the program. Thus, the PMT identifies at least two different video streams and at least one audio stream for the program.

Because it is contemplated that a single transport stream will carry many programs, it is contemplated that the transport stream will have many PMTs, and some or all of these PMTs will identify at least two video streams (e.g., an SD video stream and an HD video stream) and at least one audio stream.

Figure 13:
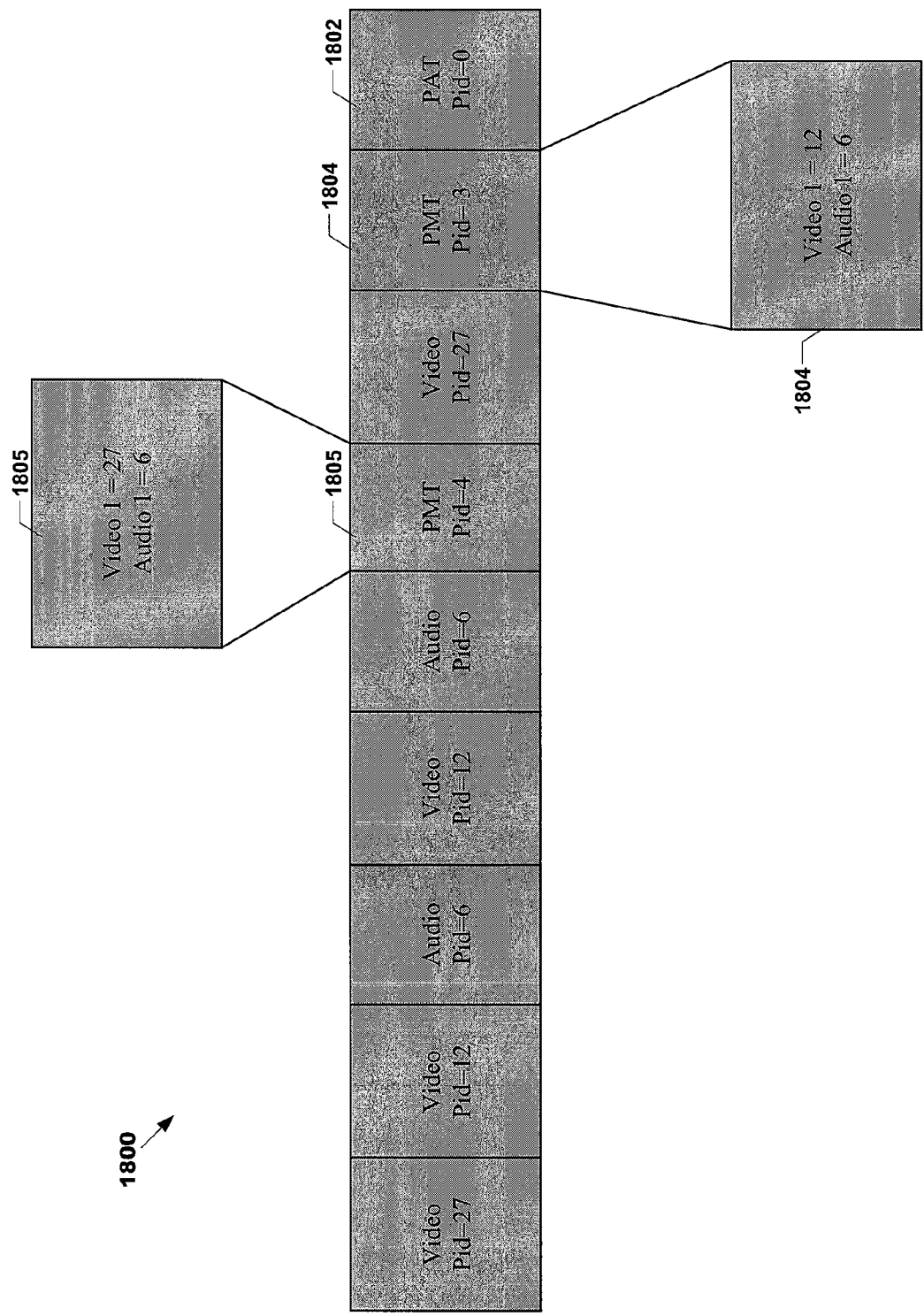
FIG. 13 illustrates a portion of a transport stream according to another embodiment of the invention.

Referring now to FIG. 13, FIG. 13 illustrates a portion of a transport stream 1800 according to another embodiment of the invention. As shown in FIG. 13, transport stream 1800 includes, among other things not shown, a PAT 1802, a first PMT 1804, a second PMT 1805, an HD video stream that is represented by the video packets having a PID of 12, an SD video stream that is represented by the video packets having a PID of 27, and an audio stream that is represented by the audio packets having a PID of 6. As is further illustrated in FIG. 13, PMT 1804, which defines the set of streams (i.e., PIDS) that are associated with a particular program, identifies PIDS 12 and 6 as being associated with the particular program and PMT 1805 identifies PIDS 27 and 6 as being associated with a particular program. Accordingly, in this embodiment, the MPEG transport stream includes two programs that have different video streams, but yet share the exact same audio stream, thereby saving bandwidth.

Accordingly, in the embodiment of FIG. 13, after the video images that correspond to a particular audio stream are generated, system 100 may be configured to (1) create a first set of video packets corresponding to the first video image (e.g., the HD video image) and assign a particular PID (e.g., PID=12) to each of the video packets included in the first set; (2) create a second set of video packets corresponding to the second video image (e.g., the SD video image) and assign a particular PID (e.g., PID=27) to each of the video packets included in the second set; (3) create or receive a set of audio packets corresponding to the particular audio stream and assign a particular PID (e.g., PID=6) to each of the audio packets; (4) create a first PMT such that the first PMT identifies (i) the particular PID (e.g., PID 12) assigned to the video packets included in the first set of video packets as containing video data for the program and (ii) the particular PID (e.g., PID 6) assigned to the audio packets containing the audio data for the program; and (5) create a second PMT such that the second PMT identifies (i) the particular PID (e.g., PID 27) assigned to the video packets included in the second set of video packets as containing video data for the program and (ii) the particular PID (e.g., PID 6) assigned to the audio packets containing the audio data for the program. Thus, the transport stream includes at least two PMTs that identify different video streams, but yet identify the same audio stream.

As is demonstrated above, various embodiments of the present invention enable a system to provide an HD program and an SD program without having to waste bandwidth by transmitting the same audio stream twice. That is, embodiments of the present invention enable HD and SD programs to share the same audio stream, thereby saving bandwidth.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for providing a visual complement to an audio service, comprising:
   selecting a sound recording;
   after selecting the sound recording, transmitting a trigger message, wherein the trigger message comprises an identifier that is associated with the selected sound recording;
   receiving the trigger message; and
   in response to receiving the trigger message, generating or selecting at least a first video image and a second video image based, at least in part, on configuration data and/or the identifier contained in the trigger message, wherein the resolution of the first video image is greater than the resolution of the second video image.

2. The method of claim 1, further comprising transmitting a stream comprising: (i) audio data packets corresponding to the selected sound recording, (ii) video packets corresponding to the first video image, and (iii) video packets corresponding to the second video image.

3. The method of claim 2, wherein the stream is a transport stream and the stream further comprises a packet containing a program map table (PMT) for identifying audio and video components of a program.

4. The method of claim 3, wherein the PMT identifies (i) the video packets corresponding to the first video image as being a component of the program, (ii) the video packets corresponding to the second video image as being a component of the program, and (iii) the audio packets as being a component of the program.

5. The method of claim 2, further comprising:
   assigning to each of the audio packets a first packet identifier (PID);
   assigning to each of the video packets corresponding to the first video image a second PID; and
   assigning to each of the video packets corresponding to the second video image a third PID, wherein the second PID is different than the first PID.

6. The method of claim 5, wherein the stream further comprises a program map table, and the program map table includes the first PID, the second PID and the third PID.

7. The method of claim 5, wherein the stream further comprises a first program map table and a second program map table, wherein the first program map table includes the first PID and the third PID and the second program map table includes the second PID and the third PID.

8. The method of claim 1, wherein the first video image comprises an intra-coded frame and the second video image comprises an intra-coded frame.

9. The method of claim 8, wherein the first video image further comprises null predictive-frames and the second video image further comprises null predictive-frames.

10. The method of claim 1, wherein the first and second video images are encoded according to an MPEG standard.

11. A system for providing a visual complement to an audio service, comprising:
   a sound recording selector configured to select a sound recording;

a trigger message transmitter configured to transmit a trigger message after the sound recording selector selects a sound recording, wherein the trigger message comprises an identifier that is associated with the selected sound recording; and a video image generator configured to generate or select at least a first video image and a second video image in response to receiving the trigger message such that the resolution of the first video image is greater than the resolution of the second video image, wherein the video image generator is configured to generate or select said video images based, at least in part, on configuration data and/or the identifier contained in the received trigger message.

12. The system of claim 11, further comprising a transmitter for transmitting a stream comprising: (i) audio data packets corresponding to the selected sound recording, (ii) video packets corresponding to the first video image, and (iii) video packets corresponding to the second video image.

13. The system of claim 12, wherein the stream is a transport stream and the stream further comprises a packet containing a program map table (PMT) for identifying audio and video components of a program.

14. The system of claim 13, wherein the PMT identifies (i) the video packets corresponding to the first video image as being a component of the program, (ii) the video packets corresponding to the second video image as being a component of the program, and (iii) the audio packets as being a component of the program.

15. The system of claim 12, further comprising an encoder configured to:

assign to each of the audio packets a first packet identifier (PID);

assign to each of the video packets corresponding to the first video image a second PID; and assign to each of the video packets corresponding to the second video image a third PID, wherein the second PID is different than the first PID.

16. The system of claim 15, wherein the stream further comprises a program map table, and the program map table includes the first PID, the second PID and the third PID.

17. The system of claim 15, wherein the stream further comprises a first program map table and a second program map table, wherein the first program map table includes the first PID and the third PID and the second program map table includes the second PID and the third PID.

18. The system of claim 11, wherein the first video image comprises an intra-coded frame and the second video image comprises an intra-coded frame.

19. The system of claim 18, wherein the first video image further comprises null predictive-frames and the second video image further comprises null predictive-frames.

20. The system of claim 11, wherein the first and second video images are encoded according to an MPEG standard.

21. A method for providing a visual complement to an audio service, comprising:

(a) assigning a first packet identifier (PID) to a first elementary stream, wherein the first elementary stream comprises video packets corresponding to a high-definition video presentation;

(b) assigning a second PID to a second elementary stream, wherein the second elementary stream comprises video packets corresponding to a standard-definition video presentation and the second PID is different than the first PID;

(c) assigning a third PID to a third elementary stream, wherein the third elementary stream comprises audio packets corresponding to a selected audio recording, wherein the third PID is different than the second PID; and (d) (1) creating a program map table that includes the first PID, the second PID and the third PID or (2) creating (i) a first program map table that includes the first PID and the third PID and (ii) a second program map table that includes the second PID and the third PID.

22. The method of claim 21, further comprising:

(e) generating or selecting the high-definition and standard definition video presentations in response to the selection of the audio recording, wherein step (e) is preformed prior to step (a).

23. The method of claim 22, wherein the generating or selecting step is performed directly in response to the receipt of a trigger message that was transmitted after the audio recording was selected, wherein the trigger message includes an identifier associated with the selected audio recording.

24. The method of claim 22, wherein the step of generating the high-definition video presentation comprises creating a video image encoded according to an MPEG standard.

25. The method of claim 21, further comprising transmitting in a single transport stream (1) the video packets corresponding to the standard-definition video presentation, (2) the video packets corresponding to the high-definition video presentation, (3) the audio packets corresponding to the selected audio recording, and (4) the program map table that includes the first PID, the second PID and the third PID.

26. The method of claim 21, further comprising transmitting in a single transport stream (1) the video packets corresponding to the standard-definition video presentation, (2) the video packets corresponding to the high-definition video presentation, (3) the audio packets corresponding to the selected audio recording, (4) the first program map table, and (5) the second program map table.

* * * * *